July 9, 1940.  D. RHEE  2,207,110

METHOD OF MAKING CUT RUBBER THREAD

Filed July 29, 1937

Inventor
Daniel Rhee
By Attorney
Chas. T. Hawley

Patented July 9, 1940

2,207,110

UNITED STATES PATENT OFFICE 2,207,110

METHOD OF MAKING CUT RUBBER THREAD

Daniel Rhee, Bristol, R. I., assignor to Carr Manufacturing Corporation, Bristol, R. I., a corporation of Rhode Island Application July 29, 1937, Serial No. 156,423

3 Claims. (Cl. 18—54)

This invention relates to the manufacture of cut rubber thread from wide sheet rubber.

It is the general object of my invention to provide an improved and simplified method of producing cut rubber thread, by which method finer threads can be produced and by which the cost of manufacture will be lowered.

My invention further relates to certain ordered procedure which will be hereinafter described and more particularly pointed out in the appended claims.

In order that the advantages of my improved process may be more clearly understood, I will first outline briefly the usual method of making cut rubber thread.

A wide unvulcanized sheet of rubber is first prepared in a machine called a calender. This sheet is dusted on one side with talc and is wound on a relatively small roll in the calender, from which it is transferred to a metal cylinder or vulcanizing drum which is usually several feet in diameter. A layer of cloth is wound on the drum simultaneously with the unvulcanized sheet of rubber, to prevent adhesion of adjacent layers of the soft unvulcanized rubber.

The sheet rubber is then vulcanized by placing the vulcanizing drum and sheeted rubber stock in a closed casing and subjecting the drum and rubber to pressure and to a relatively high temperature commonly produced by use of either steam or hot water.

After vulcanizing, the sheet rubber is unwound from the drum, the cloth is removed, and the sheet rubber is dried. After drying, the sheet is wrapped under tension around a large cutting drum or cylinder having an outer cylindrical surface cushioned with a layer of soft rubber. When wrapping the vulcanized sheet of rubber on this cutting drum, the sheet is tensioned and given a definite stretch, commonly about ten percent, so that the layers of sheet rubber will hug the drum and each other tightly, and so that the superposed layers of rubber will remain relatively rigid during the cutting operation.

The cutting is then performed by a circular knife rotated about an axis parallel to the drum and fed axially of the drum at a predetermined rate, depending upon the desired thread size.

Due to the tension applied to the rubber sheet while being wound on the cutting drum, the feed of the knife must be somewhat finer than the actual size of the thread to be produced, as the cut thread will contract in length and simultaneously increase in diameter when released from tension. It is commonly necessary to cut about ten percent finer than the desired thread size. Thus, if size 10 thread is required, a feed corresponding to size 11 must be used.

In the accompanying drawing, which illustrates suitable apparatus adapted for use in practicing my improved method, Fig. 1 is a diagrammatic side elevation of conventional apparatus for producing a calendered sheet and for dusting and winding the same;

No novelty is claimed in the apparatus disclosed, as applicant's invention relates to a method of operation, rather than to the structure of the disclosed apparatus.

Figure 1:
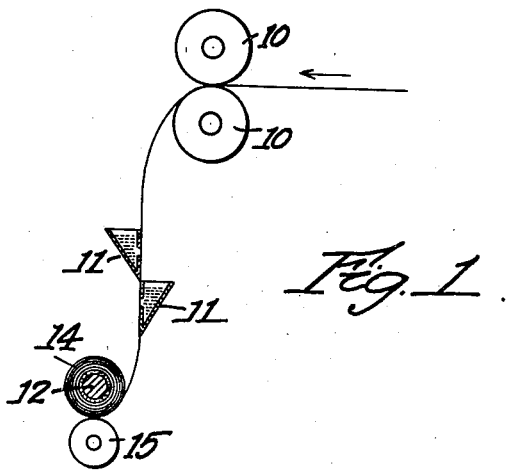
Figure 2:
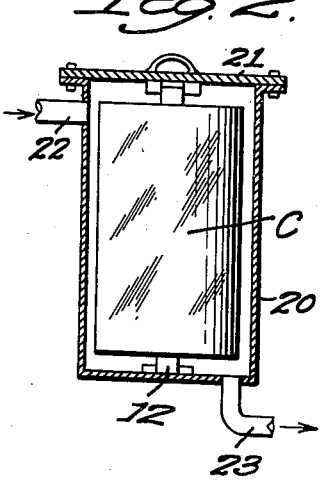
Fig. 2 is a sectional view of a vulcanizing casing and connections.

In producing cut rubber thread according to my improved method, the rubber stock is first sheeted by being pressed between rotated calender rolls 10 (Fig. 1), as is the usual practice. As the rubber leaves the calender rolls, the unvulcanized rubber sheet passes downward between suitable dusting devices, such as talc boxes 11, by which the sheet is dusted on both sides with a desired amount of talc or other powder.

The unvulcanized but dusted sheet of rubber is then wound directly on a cutting drum 12 having a cushion layer 14 of soft rubber or other similar material disposed on its outer cylindrical surface. The cutting drum and its superposed rubber winding are preferably supported and rotated by a roll 15 driven in such speed relation to the calender rolls 10 that the sheet rubber is relaxed and under no tension.

The layers of unvulcanized sheet rubber are thus wrapped around the cutting drum 12 in face-to-face relation and without interposed layers of cloth. A cloth C may be wrapped around the outer face of the sheet rubber mass after it has been wound upon the drum, but this cloth is used merely to prevent sagging of the soft rubber before and during the vulcanizing operation and not for separation of the layers.

The winding drum 12, together with the unvulcanized but dusted sheet rubber wound thereon, is then transferred to a vulcanizing casing or chamber 20 of any usual type but preferably having a removable clamped cover 21, a steam connection 22 and a drain pipe 23 for removal of condensed water. The rubber wound on the drum 12 is then subjected to steam at a desired pressure and temperature and for a suitable period to produce the desired degree of vulcanization, all of which is the usual commercial procedure for vulcanizing sheet rubber.

By using a limited amount of talc, the adjacent layers of sheeted rubber stock will adhere to a considerable extent after the vulcanizing operation and will form a laminated mass on the cutting drum which is sufficiently rigid for cutting purposes.

The cutting drum 12 with its laminated mass of vulcanized sheet rubber is then removed from the vulcanizing casing and is mounted in a cutting machine, where the wound sheet rubber is formed into threads.

Figure 3:
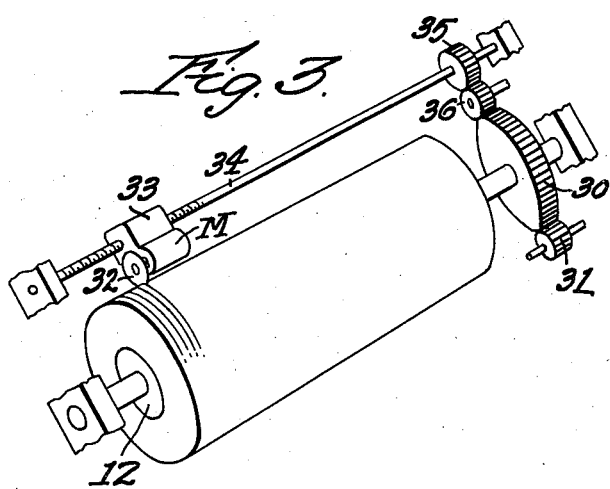
Fig. 3 is a perspective view of conventional thread-cutting apparatus.

A commercial form of cutting machine is shown in Fig. 3, in which the cutting cylinder 12 with its superposed layers of rubber is mounted in bearings and slowly rotated, as by a gear 30 and driving pinion 31. A circular cutting knife 32 is mounted on a carriage 33 and is rapidly rotated by a motor M. The carriage 33 is moved axially of the drum 12 by a lead screw 34 connected through change gears 35 and 36 to the cylinder gear 30, the change gears being selected to give the correct axial feed to produce threads of a desired size.

The described apparatus is all in common commercial use, with the exception that different cylinders are commonly used in the calendering, vulcanizing and cutting mechanisms.

As the sheet rubber is relaxed and not under tension, the threads do not contract in length and increase in diameter when released, and the feed may be substantially equal to the desired diameter of the finished thread. This is an important advantage, as there is a definite limit to the permissible fineness of the knife feed, and substantially finer threads may thus be produced by my improved process in which no allowance for shrinkage is required.

While the successive vulcanized layers adhere sufficiently to permit the cutting operation to be satisfactorily performed, the severed radially disposed helical band of laminated sheet rubber may be readily separated into individual threads after the cutting operation has been performed.

My improved process of making cut rubber thread is thus much simpler than the previous process, and omits several steps heretofore considered necessary. No separate vulcanizing drum is required, the use of cloth between the layers during vulcanizing is omitted, the vulcanized sheet rubber need not be unwrapped for drying before cutting, and the feed of the cutting knife may be the same as the desired size of the finished thread.

Having thus described my invention and the advantages thereof, I do not wish to be limited to the details herein disclosed, otherwise than as set forth in the claims, but what I claim is:

1. The method of making cut rubber thread which comprises preparing an unvulcanized sheet of rubber, winding said sheet in superposed face-to-face layers on a cutting drum but preventing close adhesion of the unvulcanized layers, vulcanizing said superposed layers on said cutting drum and thereby causing said layers to adhere and form a laminated and relatively rigid mass, transferring said drum and vulcanized laminated mass as a unit to a cutting machine, slicing said mass on said drum to form a radially-disposed band of superposed thread layers, and separating said superposed thread layers.

2. The method of making cut rubber thread which comprises preparing an unvulcanized sheet of rubber, winding said sheet in relaxed condition in superposed face-to-face layers on a cutting drum having a cushion surface but preventing close adhesion of the unvulcanized layers, vulcanizing said superposed layers on said cutting drum and thereby causing said layers to adhere and form a laminated and relatively rigid mass, transferring said cutting drum and vulcanized laminated mass as a unit to a cutting machine, progressively slicing said mass on said drum to form a helical radially-disposed band of superposed thread layers, and separating said superposed thread layers to the form of continuous rubber threads.

3. The method of making cut rubber thread which comprises preparing an unvulcanized sheet of rubber, dusting both sides of said sheet with a suitable powder, winding said sheet in superposed face-to-face layers on a cutting drum, vulcanizing said superposed layers on said cutting drum and thereby causing said layers to adhere and form a laminated and relatively rigid mass, transferring said cutting drum and vulcanized laminated mass as a unit to a cutting machine, progressively slicing said mass on said drum to form a helical radially-disposed band of superposed thread layers, and separating said superposed thread layers to form a rubber thread.

DANIEL RHEE.